United States Patent
Khayrallah

(10) Patent No.: US 8,379,774 B2
(45) Date of Patent: Feb. 19, 2013

(54) METHOD AND APPARATUS FOR MERGING BIT PROBABILITY INFORMATION IN SERIAL LOCALIZATION WITH INDECISION

(75) Inventor: Ali Khayrallah, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 522 days.

(21) Appl. No.: 12/609,466

(22) Filed: Oct. 30, 2009

(65) Prior Publication Data

US 2011/0103528 A1    May 5, 2011

(51) Int. Cl.
*H04L 27/06* (2006.01)
(52) U.S. Cl. .................. 375/341; 375/340; 375/316
(58) Field of Classification Search .................. 375/341, 375/340, 316
See application file for complete search history.

(56) References Cited

U.S. PATENT DOCUMENTS

| | | | |
|---|---|---|---|
| 6,151,370 A * | 11/2000 | Wei | 375/341 |
| 7,564,892 B1 * | 7/2009 | Lidstrom et al. | 375/211 |
| 2004/0052317 A1 | 3/2004 | Love et al. | |
| 2004/0184563 A1* | 9/2004 | Bach et al. | 375/324 |

FOREIGN PATENT DOCUMENTS

| | | |
|---|---|---|
| EP | 1 324 558 A1 | 7/2003 |
| EP | 1 718 019 A1 | 11/2006 |

OTHER PUBLICATIONS

G. E. Bottomley, "Block equalization and generalized MLSE arbitration for the HSPA WCDMA uplink," Proc. IEEE VTC Fall 2008, Sep. 2008.

* cited by examiner

*Primary Examiner* — Shuwang Liu
*Assistant Examiner* — Michael Neff

(57) ABSTRACT

Probability information generated by a decoder as part of the symbol decoding process is fed back for use by a multi-stage demodulator that employs serial localization with indecision so that the accuracy of the final symbol decision generated by the multi-stage demodulator is improved. The multi-stage demodulator has one or more non-final stages operable to localize a search for the final symbol decision of a received signal using centroid-based values as constellation points instead of modulation symbols associated with the received signal. A final stage of the multi-stage demodulator is operable to determine the final symbol decision using a subset of the modulation symbols as constellation points. The decoder is operable to decode the final symbol decision, including generating probability information related to the modulation symbols. The multi-stage demodulator is operable to revise the final symbol decision based on the probability information related to the modulation symbols.

20 Claims, 7 Drawing Sheets

METHOD AND APPARATUS FOR MERGING BIT PROBABILITY INFORMATION IN SERIAL LOCALIZATION WITH INDECISION

TECHNICAL FIELD

The present invention generally relates to serial localization with indecision, and more particularly relates to using bit reliability information generated by a decoder to enhance the performance of serial localization with indecision.

BACKGROUND

Serial localization with indecision (SLI) has been used to reduce demodulation complexity while maintaining sufficient performance. For example, SLI was implemented with MLD (Maximum Likelihood Detector) in commonly assigned U.S. patent application Ser. No. 12/549,132, entitled "DEMODULATION USING SERIAL LOCALIZATION WITH INDECISION" and filed 27 Aug. 2009, which is incorporated herein by reference in its entirety. SLI was also implemented with MLSE (Maximum Likelihood Sequence Estimator) in commonly assigned U.S. patent application Ser. No. 12/549,143, entitled "EQUALIZATION USING SERIAL LOCALIZATION WITH INDECISION" and filed 27 Aug. 2009, which is incorporated herein by reference in its entirety. SLI was implemented as part of an MSA (Multi-Stage Arbitration) demodulator in commonly assigned U.S. patent application Ser. No. 12/549,157, entitled "JOINT DEMODULATION AND INTERFERENCE SUPPRESSION USING SERIAL LOCALIZATION" and filed 27 Aug. 2009, which is incorporated herein by reference in its entirety.

SLI has an indecision feature which arises from representing the modulation constellation with overlapping subsets of centroid-based values. The indecision feature is beneficial for multi-stage structures, because the indecision reduces irreversible erroneous decisions in earlier stages. A particular SLI block represents subsets of constellation symbols by their respective centroid or other centroid-based value, and treats the centroid-based values as a demodulation constellation. By detecting a particular centroid-based value, an SLI block effectively localizes the search for the final symbol decision, since the next stage focuses on the symbol subset associated with the detected centroid-based value.

SLI becomes more beneficial where the effective constellation is very large. Larger signal constellations such as 16, 32 and 64 QAM (Quadrature Amplitude Modulation) have been adopted in EDGE (Enhanced Data rates for GSM Evolution), HSPA (High Speed Packet Access), LTE (Long Term Evolution) and WiMax (Worldwide Interoperability for Microwave Access). In HSPA, multi-code transmission creates even larger effective constellations. MIMO (Multiple-Input, Multiple-Output) schemes have been adopted in HSPA, LTE and WiMax, creating large effective constellations. Demodulation complexity is further exacerbated when these techniques occur in combination. Another issue is ISI (Inter-Symbol Interference), which makes the demodulation complexity grow with a power of the size of the effective constellation.

SUMMARY

A receiver includes an SLI-type multi-stage demodulator and a decoder for processing received signals. The multi-stage SLI demodulator employs serial localization with indecision as part of the signal demodulation process, by using centroid-based values as constellation points. Probability information generated by the decoder as part of the symbol decoding process is fed back for use by the multi-stage SLI demodulator so that the accuracy of the final symbol decision generated by the multi-stage demodulator can be improved.

According to an embodiment, the multi-stage demodulator has one or more non-final stages operable to localize a search for the final symbol decision of a received signal using centroid-based values as constellation points instead of modulation symbols associated with the received signal. A final stage of the multi-stage demodulator is operable to determine the final symbol decision using a subset of the modulation symbols as constellation points. The decoder is operable to decode the final symbol decision, including generating probability information related to the modulation symbols. The multi-stage demodulator is operable to revise the final symbol decision based on the probability information related to the modulation symbols.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
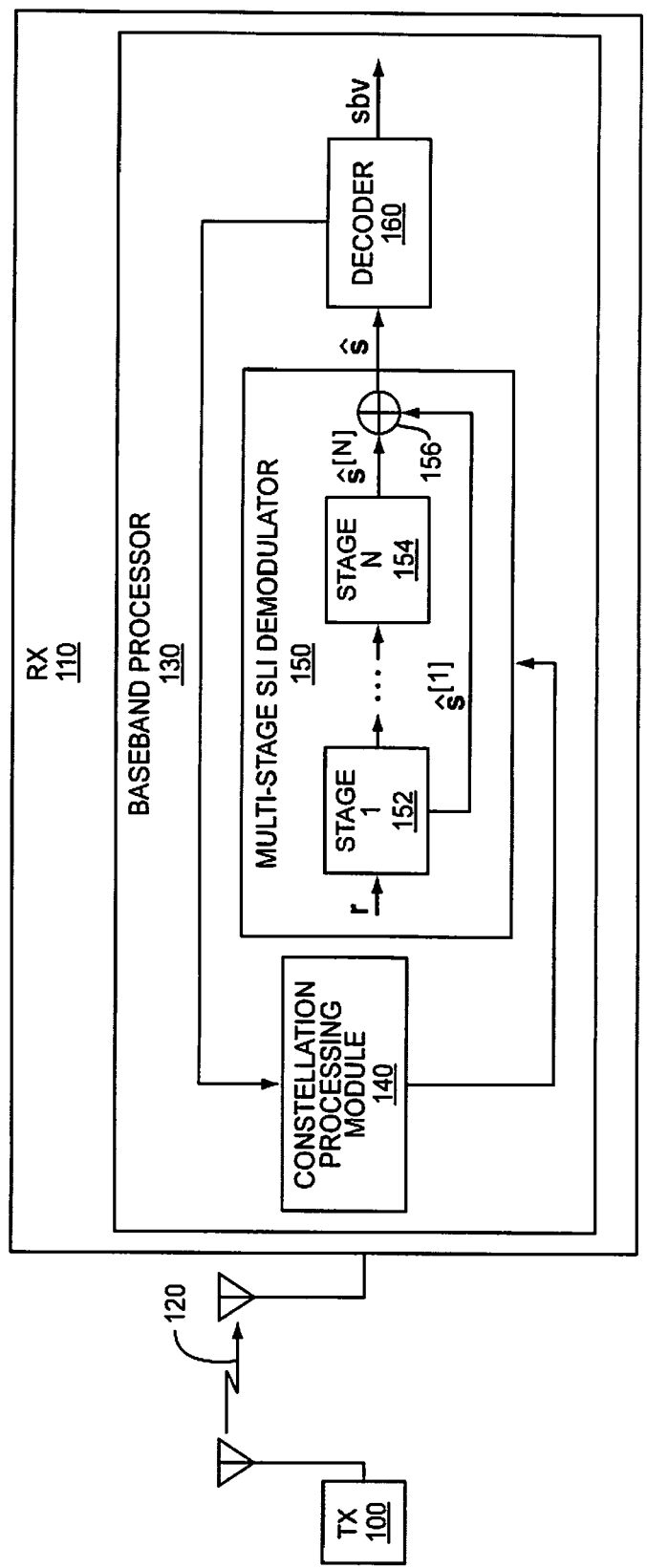
FIG. 1 illustrates a block diagram of an embodiment of a receiver including a multi-stage SLI demodulator, a decoder and a constellation processing module.

FIG. 1 illustrates an embodiment of a wireless transmitter 100 in communication with a wireless receiver 110 over a channel 120. The receiver includes a baseband processor 130 and a constellation processing module 140, multi-stage SLI demodulator 150 and a decoder 160 included in or associated with the baseband processor 130. The constellation processing module 140 groups modulation symbols associated with the received signal into a plurality of subsets, e.g., subsets of ASK modulation symbols, QAM modulation symbols, etc. At least two adjacent subsets have one or more common modulation symbols to ensure that these adjacent subsets overlap. In some embodiments, all adjacent subsets have one or more common modulation symbols to ensure that all adjacent subsets overlap. In each case, the constellation processing module 140 also determines a centroid-based value for each subset of modulation symbols and groups the centroid-based values into one or more sets. The values included in each set are centroid-based in that they may be actual centroids, approximations of centroids such as integer values or values quantized to a certain finite precision, the closest modulation symbol to a centroid, etc. More generally, each subset of modulation symbols is assigned a centroid-based representative, referred to broadly herein as a centroid-based value.

The multi-stage SLI demodulator 150 has N stages for performing signal demodulation. Each non-final stage 152 of the SLI demodulator 150 localizes the search for a final symbol decision ŝ for the received signal r using the set of centroid-based values input to or selected by the stage as constellation points. The final stage 154 of the SLI demodulator 150 determines the final symbol decision ŝ using a subset of the actual modulation symbols associated with the received signal r as constellation points. This way, each stage 152 of SLI demodulator 150 except for the last stage 154 further localizes the search for a solution using a set of centroid-based values as constellation points, reducing the overall complexity of the demodulator. The last stage 154 of the SLI demodulator 150 outputs the final solution based on a subset of the actual modulation symbols. The constellation processing module 140 ensures that at least two adjacent subsets of modulation symbols overlap to reduce the likelihood of demodulation errors, particularly in the earlier demodulation stages 152.

The multi-stage SLI demodulator 150 can implement any type of symbol detection algorithm and can be adapted for single-code or multi-code transmission, as well as single-antenna or multi-antenna schemes. For example, an L×L MIMO system can be described as given by:

$$r = Hs + v \quad (1)$$

where r, s and v are L×1 vectors, r represents the received signal, s represents the transmitted symbols, v represents noise, and H is an L×L channel matrix. Each stream has symbol constellation Q of size q modulation symbols. The noise v is white and Gaussian by default. A conventional MLD would compare all $q^L$ symbol (vector) candidates $s_l$ in $Q^L$ to the received signal r, in order to determine the closest one in the squared Euclidean distance sense as given by:

$$m(s_l) = (r - Hs_l)^H (r - Hs_l)/\sigma^2 \quad (2)$$

which is normalized by the noise variance $\sigma^2$. A conventional MLD outputs the best symbol, denoted ŝ. In this scenario, the conventional MLD coincides with a joint detector (JD) over L simultaneous symbols.

For the multi-stage SLI demodulator 150, the input to the i-th non-final stage 152 of the SLI demodulator 150 is the modified received signal $r^{[i-1]}$ from the immediately preceding stage. The i-th non-final stage 152 of the SLI demodulator 150 outputs symbols $\hat{s}'^{[i]}$ and generates a re-modulated signal $\hat{r}'^{[i]} = H\hat{s}'^{[i]}$, which is subtracted from $r^{[i-1]}$ to produce modified received signal $r^{[i]}$. The modified received signal $r^{[i]}$ is fed to the next stage of the demodulator 150 for processing. The detector (not shown in FIG. 1) included in the i-th non-final stage 152 of the SLI demodulator 150 can implement MLD over a constellation $Q'^{[i]}$ of size $q'^{[i]}$ centroid-based values, the MLD being capable of handling all L symbols simultaneously. For stage i<N, $q'^{[i]}$ subsets of the true constellation Q are generated by the constellation processing module 140, denoted as $T_j^{[i]}$. The symbol subsets determine the $\hat{s}'_j^{[i]}$ elements of $Q'^{[i]}$. Specifically, $s'_j^{[i]}$ is a centroid-based value of $T_j^{[i]}$. The centroid-based value can be a straight average, as given by:

$$s'^{[i]}_j = \frac{1}{|T_j^{[i]}|} \sum_{s_k \in T_j^{[i]}} s_k \quad (3)$$

In general, the elements of $Q'^{[i]}$ may not belong to Q.

The input to the first stage 152 of the multi-stage SLI demodulator 150 is the original received signal $r^{[0]} = r$. For the last stage 154, the constellation $Q'^{[N]}$ is a subset of the Q modulation symbols associated with the received signal r. Also, no re-modulation is performed at the last stage 154 of the SLI demodulator 150. In one embodiment, the last stage 154 implements MLD on what is left from the signal in $r^{[N-1]}$. A summer 156 provides the overall final symbol vector decision ŝ by adding the intermediate decisions from all of the stages 152, 154 as given by:

$$\hat{s} = \hat{s}'^{[1]} + \ldots + \hat{s}'^{[N]} \quad (4)$$

Each non-final stage 152 of the SLI demodulator 150 compares $(q'^{[i]})^L$ candidates. Thus, the complexity advantage of SLI is that it breaks up the MLD search into a series of smaller MLD searches.

In addition to ŝ, the SLI demodulator 150 produces bit decisions and their corresponding soft values. Symbol vector ŝ is made up of L modulation symbol decisions $\hat{s}_j$. Let $\hat{y}_{j,1}, \ldots \hat{y}_{j,N}$ denote the decisions for the modem bits that map into symbol $\hat{s}_j$. Also, let $\mu_{j,k}^{dem}$ denote the corresponding soft values for $\hat{y}_{j,k}$. The modem bit soft values can be in log likelihood ratio (LLR) form, or an approximation thereof. The terms LLR and modem bit probability are used herein interchangeably. The corresponding probability of modem bit $\hat{y}_{j,k}$ out of the SLI demodulator 150 is denoted $p^{dem}(\hat{y}_{j,k})$. The LLR of the modem bit is then given by:

$$\mu_{j,k}^{dem} = \ln\left(\frac{p^{dem}(\hat{y}_{j,k}=0)}{p^{dem}(\hat{y}_{j,k}=1)}\right) = \ln\left(\frac{p^{dem}(\hat{y}_{j,k}=0)}{1 - p^{dem}(\hat{y}_{j,k}=0)}\right) \quad (5)$$

That is, a positive $\mu_{j,k}^{dem}$ indicates a 0. The modem bit probability can also be expressed as given by:

$$p^{dem}(\hat{y}_{j,k}=0) = \frac{\exp(\mu_{j,k}^{dem})}{1 + \exp(\mu_{j,k}^{dem})} \quad (6)$$

Thus, the baseband processor 130 can readily go back and forth between the probability and LLR domains as needed. One method for generating modem bit soft values out of the SLI demodulator 150 is described in commonly assigned U.S. patent application Ser. No. 12/604,570, entitled "Method for Post Detection Improvement in MIMO" and filed 23 Oct. 2009, which is incorporated herein by reference in its entirety. Described next is the first iteration of the receiver 110, where the SLI demodulator 150 sends modem bit soft values to the decoder 160, and the decoder 160 feeds back its own modem bit soft values to the SLI demodulator 150. Operation of the receiver 110 in multiple iteration mode is described later herein.

The modem bit soft values $\mu_{j,k}^{dem}$ generated by the multi-stage SLI demodulator 150 are provided to the decoder 160. The decoder 160 in turn generates probability information for the information bits. The decoder 160 also generates probability information for the corresponding modem bits. The modem bits correspond to the information bits after encoding at the transmitter 100. If an interleaver is present between the transmitter encoder and modulator, then the modem bits are simply re-ordered as they go through the interleaver. The modem bits are otherwise unchanged. The decoder 160 produces soft values about the information bits, and soft values about the modem bits, denoted $\mu_{j,k}^{dec}$. For example, the decoder 160 may be a MAP (maximum a posteriori) decoder which generates soft values for the information bits and corresponding modem bits.

The values $\mu_{j,k}^{dec}$ are de-biased, by subtracting $\mu_{j,k}^{dem}$. The refined modem bit values out of the decoder 160 are given by $\lambda_{j,k}^{dec} = \mu_{j,k}^{dem} - \mu_{j,k}^{dec}$. The probability of modem bit $\hat{y}_{j,k}$ out of the decoder 160 corresponding to $\lambda_{j,k}^{dec}$ is denoted $p^{dec}(\hat{y}_{j,k})$, and given by:

$$p^{dec}(\hat{y}_{j,k} = 0) = \frac{\exp(\lambda_{j,k}^{dec})}{1 + \exp(\lambda_{j,k}^{dec})} \quad (7)$$

Given the probabilities $p^{dec}(\hat{y}_{j,1}), \ldots, p^{dec}(\hat{y}_{j,N})$ produced by the decoder 160, the probability of the corresponding symbol $\hat{s}_j$ is given by:

$$p(\hat{s}_j) = p^{dec}(\hat{y}_{j,1}) \ldots p^{dec}(\hat{y}_{j,N}) \quad (8)$$

Symbol probabilities generated by the constellation processing module 130 based on the probability information generated by the decoder 160 are incorporated into the multi-stage SLI demodulator 150 for improving receiver performance.

In more detail, modem bit probabilities, or equivalently the LLRs, are produced by the decoder 160 as described above and used by the constellation processing module 140 to compute the symbol probabilities $p(\hat{s}_j)$ for all modulation symbols included in constellation Q as given by equation (7). Focusing on the ith non-final stage 152 of the SLI demodulator 150, the constellation processing module 140 computes new centroid-based values from the modulation symbol subsets $T_j^{[i]}$ using $p(\hat{s}_j)$. The ith non-final demodulator stage 152 can use the new centroid-based values instead of the original values to re-localize the search for the final symbol decision $\hat{s}$. In one embodiment, new centroids are computed from the modulation symbol subsets $T_j^{[i]}$ as given by:

$$s'_j{}^{[i]} = \frac{1}{\sum_{\hat{s}_k \in T_j^{[i]}} p(\hat{s}_k)} \sum_{\hat{s}_k \in T_j^{[i]}} \hat{s}_k p(\hat{s}_k) \quad (9)$$

Actual centroids need not be used. That is, other centroid-based values may be newly determined such as approximations of centroids, e.g. new integer values or new values quantized to a certain finite precision, the closest modulation symbol to a centroid, etc. The constellation processing module 140 can also determine the probability of the centroid-based values, e.g. as given by:

$$p(s'_j{}^{[i]}) = \sum_{\hat{s}_k \in T_j^{[i]}} p(\hat{s}_k) \quad (10)$$

The multi-stage SLI demodulator 150 revises the final symbol decision $\hat{s}$ based on the probability information produced by the decoder 160.

Again focusing on the ith non-final stage 152 of the SLI demodulator 150, the new centroid-based values and/or the centroid-based probability information can be merged into the detector block of the ith non-final stage 152. For example, a centroid vector $s'_l{}^{[i]}$ is made up of L centroids $s'_j{}^{[i]}$. Each $s'_j{}^{[i]}$ has a different probability distribution $p(s'_j{}^{[i]})$, inferred from the corresponding modem bits. As a result, the centroids computed according to (8) are different for each index j. Thus, there are now L distinct new centroid-based constellations, instead of the single original constellation $Q'^{[i]}$. Secondly, the metric used by the ith non-final stage 152 of the SLI demodulator 150 to localize the search for the final symbol decision can be modified to include the centroid-based probabilities, e.g. given by equation (9). The probability of centroid vector $s'_l{}^{[i]}$ can be determined as given by:

$$p(s'_l{}^{[i]}) = \prod_j p(s'_j{}^{[i]}) \quad (11)$$

The metric used by the ith non-final stage 152 of the SLI demodulator 150 to localize the search for the final symbol decision can be modified based on the centroid-based probability information $p(s'_l{}^{[i]})$ as given by:

$$m(s'_l{}^{[i]}) = (r - Hs'_l{}^{[i]})^H (r - Hs'_l{}^{[i]})/\sigma^2 - 2\ln(p(s'_l{}^{[i]})) \quad (12)$$

where $-2 \ln(p(s'_l{}^{[i]}))$ is the probability bias term associated with the centroid-based values. Overall, the symbol probabilities computed by the constellation processing module 140 bias the metric $m(s'_l{}^{[i]})$ in favor of more likely symbols.

In one embodiment, the original centroid-based values, e.g. as given by equation (3) are not modified based on the probability information generated by the decoder 160. Only the metric employed by the non-final stage(s) 152 of the SLI demodulator 150 is modified based on the modem bit probability information, e.g. as given by equation (12). The centroid-based alphabets are thus fixed according to this embodiment, which may be suitable for a hardwired implementation of an MLD or other type of detector included in the non-final stage(s) 152 of the SLI demodulator 150. In another embodiment, the centroid-based values are modified based on the modem bit probability information generated by the decoder 160, e.g. as given by equation (8), but the original metric employed by the non-final stage(s) 152 of the SLI demodulator 150 remains unmodified. Again, a simpler metric may be suitable for a hardwired demodulator implementation. In yet another embodiment, the search for the final symbol decision $\hat{s}$ is re-localized by the non-final stage(s) 152 of the SLI demodulator 150 based on both the new centroid-based values and the centroid-based probability information. Described next are various embodiments relating to different detector types which may be implemented by the multi-stage SLI demodulator 150.

Figure 2:
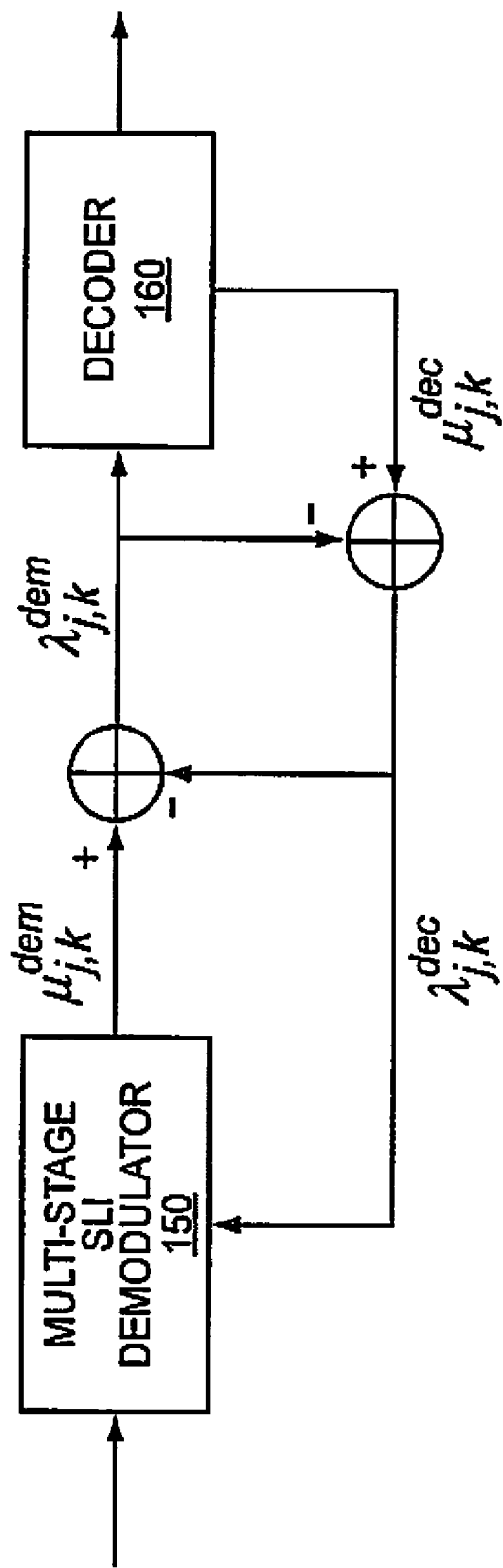
FIG. 2 illustrates a block diagram of the multi-stage SLI demodulator and the decoder included in the receiver of FIG. 1.

Described next is operation of the receiver 110 in multiple iteration mode. Beginning with the second iteration, the SLI demodulator 150 uses the received values and the modem bit soft values $\lambda_{j,k}^{dec}$ from the decoder 160 to produce a new set of modem bit soft values $\mu_{j,k}^{dem}$. The new modem bit soft values are de-biased, by subtracting the $\lambda_{j,k}^{dec}$. The refined modem bit values out of the SLI demodulator 150 are given by $\lambda_{j,k}^{dem} = \mu_{j,k}^{dem} - \lambda_{j,k}^{dec}$. The refined values $\lambda_{j,k}^{dem}$ are fed to the decoder 160 in the second iteration instead of $\mu_{j,k}^{dem}$. The decoder then processes the values $\lambda_{j,k}^{dem}$ to produce a new set of modem bit soft values $\mu_{j,k}^{dec}$. Those values are again de-biased, by subtracting $\lambda_{j,k}^{dem}$. The refined values $\lambda_{j,k}^{dec}$ are fed to the SLI demodulator 150 for the third iteration. Subsequent iterations operate in a similar way, with de-biasing at both the SLI demodulator 150 and the decoder 160. The general iterative structure of the multi-stage SLI demodulator 150 and the decoder 160 with feedback is shown in FIG. 2.

SLI can mimic the behavior of MLD. The performance of the multi-stage SLI demodulator 150 is primarily limited by that of the early stages 152, which in turn is determined by the choice of symbol subsets. Performance suffers when no adjacent subsets overlap. Consider the case of disjoint subsets. MLD implicitly defines a decision region (Voronoi region) around each constellation point, consisting of received values closest to that point than any other. The decision region boundaries are polyhedrons (made up of sections of hyperplanes). Two constellation points x and y are neighbors if their decision regions touch. The common part is a section of the hyperplane P(x,y) that bisects the space according to x and y. In degenerate cases, the common part can become a line or a point. Now consider two adjacent subsets X and Y of Q which are available to the first stage 152 of the SLI demodulator 150. Subsets X and Y have centroids c(X) and c(Y), respectively. Consider neighbor pair (x,y), where x belongs to X and y belongs to Y. Suppose x is transmitted, and the first stage 152 of the SLI demodulator 150 makes an error and chooses subset Y instead of subset X. The effective decision boundary of the first stage 152 is the hyperplane P(c(X),c(Y)). In contrast, MLD would make the choice based on P(x,y). For the sake of comparison, MLD can be thought of as making an effective decision between X and Y. Then the effective decision boundary is made up of the sections P(x,y) of different nearest neighbor pairs (x,y).

Figure 3:
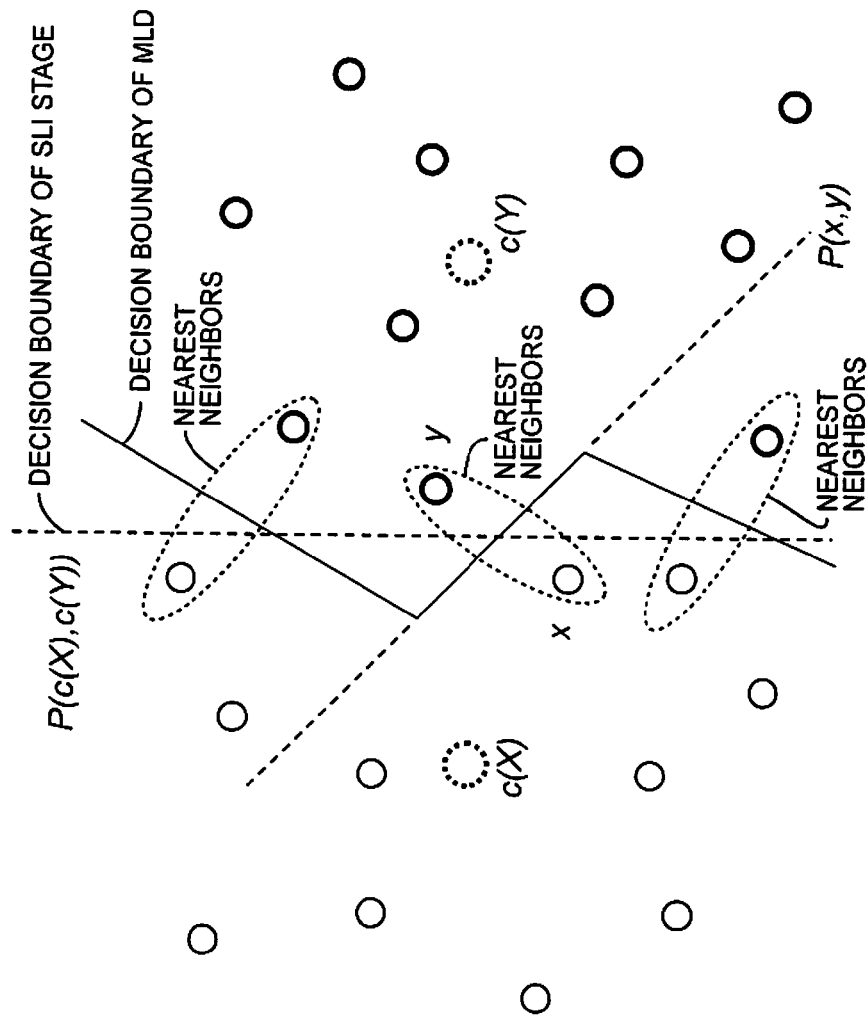
FIG. 3 illustrates a diagram of an embodiment of overlapping constellation subsets for use by a multi-stage SLI demodulator.

FIG. 3 illustrates the effective decision boundary between adjacent subsets X and Y in two dimensions, where the hyperplane becomes a straight line and each constellation point is represented by a circle. In contrast, the decision boundary for MLD is a piecewise straight jagged line. The discrepancy between these hypothetical decision boundaries leads to a performance loss in SLI. Overlapping two or more adjacent subsets smoothes the decision boundary discrepancy. In particular, for two-stage SLI, including nearest neighbor symbols pairs in the overlap of adjacent subsets of the first SLI stage means that the first SLI stage does not have to make a decision about those symbols. That decision will be made in the second SLI stage.

With SLI, the search is further localized from one stage to the next, but the final decision is not made until the last stage. In particular, by making nearest neighbor modulation symbols belong to multiple subsets, a later stage of the multi-stage SLI demodulator 150 may recover from an error in an earlier stage. In this context, indecision is beneficial. However, ensuring adjacent symbol subsets overlap has a cost. In terms of complexity, q' or q", or both, will increase for the overlap case in comparison to the disjoint case.

Figure 4:
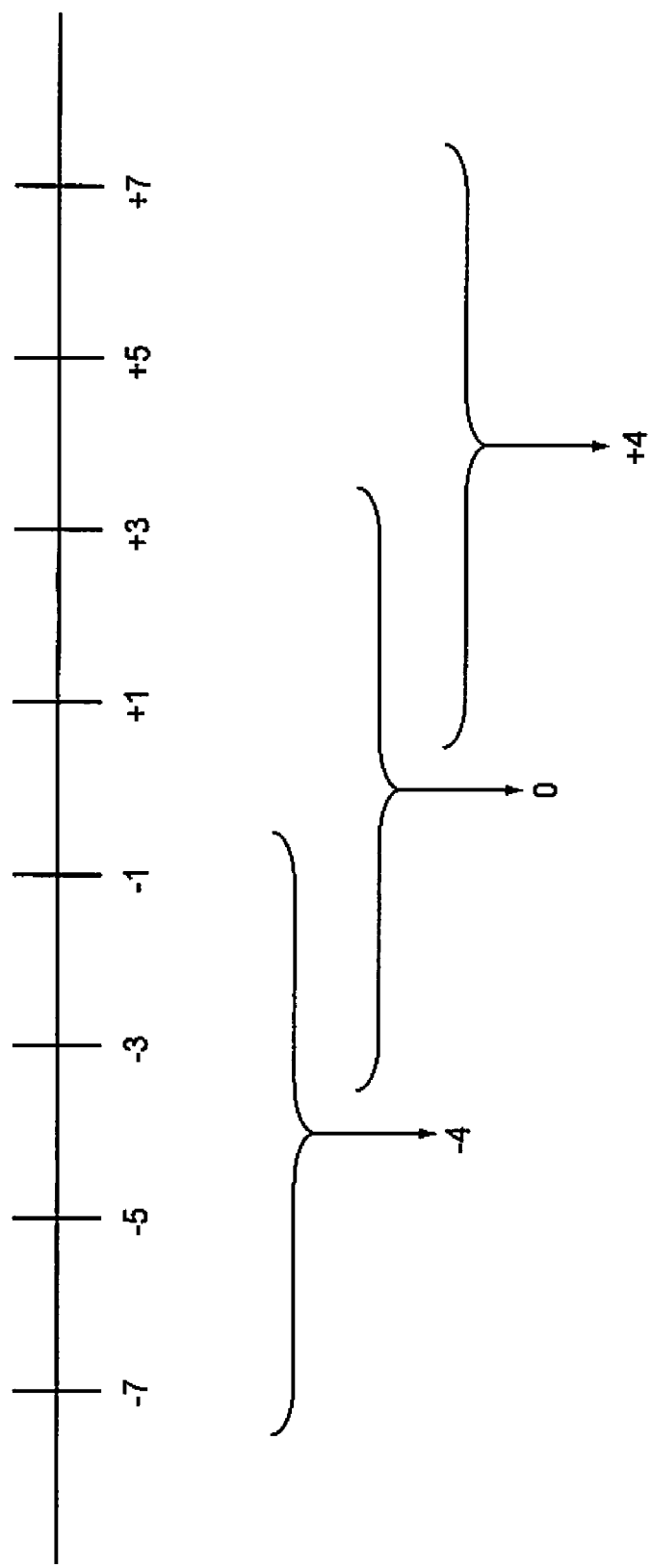
FIG. 4 illustrates a diagram of an embodiment of overlapping ASK constellation subsets for use by a multi-stage SLI demodulator.

FIG. 4 illustrates an exemplary embodiment of an 8-ASK constellation grouped into three subsets by the constellation processing module 140. The 8-ASK constellation is given by:

$$Q=\{-7,-5,-3,-1,+1,+3,+5,+7\} \quad (13)$$

The three overlapping subsets shown in FIG. 4 have centroids given by:

$$Q'=\{-4,0,+4\} \quad (14)$$

The overlap means that later stage(s) of the multi-stage SLI demodulator 150 can often recover from a bad decision by an earlier stage. The two outer subsets shown in FIG. 4 are offsets of one another, and the offset is equal to the centroid difference. SLI complexity can be further reduced by accounting for the highly structured nature of these subsets. Of course, less structured subsets can also be used with SLI, and the subset grouping described herein readily extends to other modulation schemes such as QAM (Quadrature Amplitude Modulation).

Figure 5:
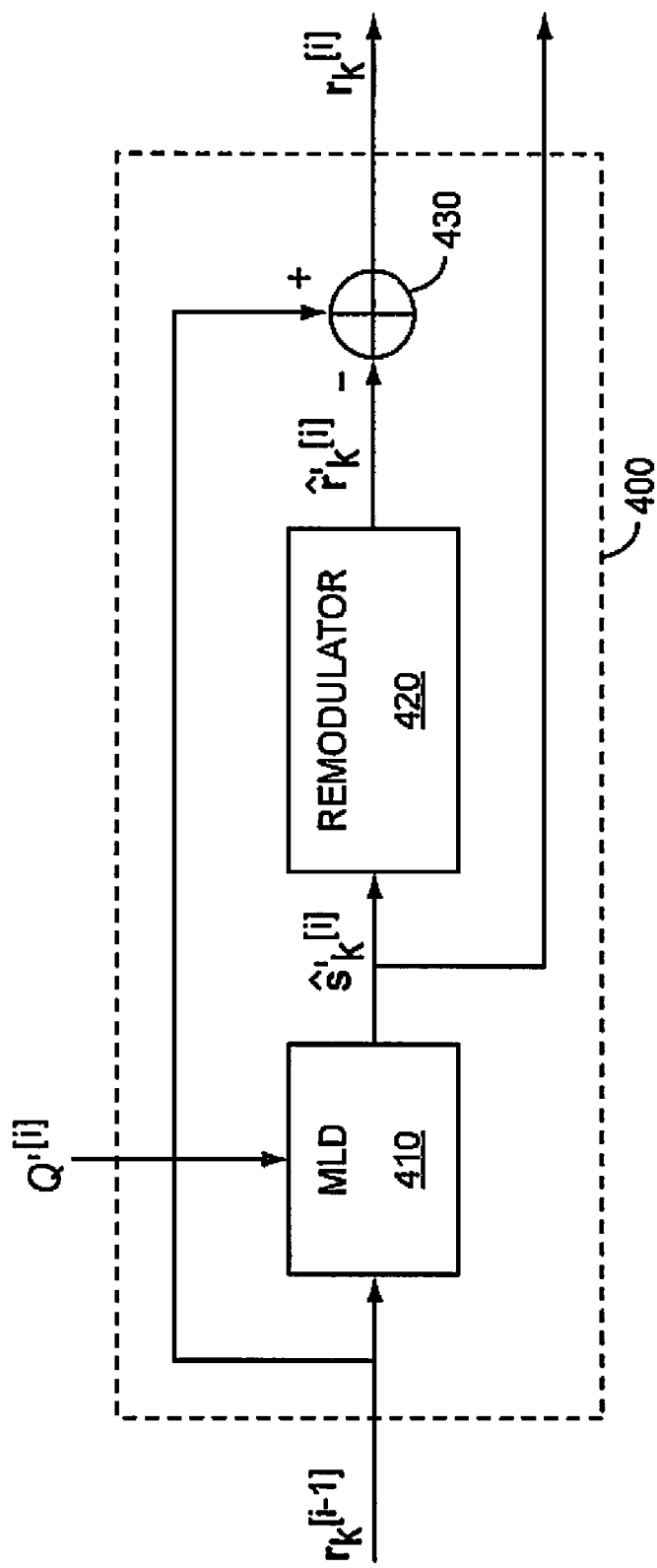
FIG. 5 illustrates a block diagram of an embodiment of an i-th non-final MLD stage of an SLI demodulator.

FIG. 5 illustrates an embodiment of an i-th non-final MLD stage 400 of the SLI demodulator shown 150. The input to the i-th MLD stage 400 is the modified received signal $r_k^{[i-1]}$ output by the immediately preceding stage (not shown in FIG. 5). The constellation $Q'^{[i]}$ input to the i-th MLD stage 400 includes a set of centroid-based values determined as previously described herein. A MLD component 410 of the i-th stage 400 outputs symbols $\hat{s}'_k{}^{[i]}$ based on $Q'^{[i]}$ and $r_k^{[i-1]}$. A re-modulator component 420 of the i-th stage 400 generates a re-modulated signal $\hat{r}'_k{}^{[i]} = H_0 \hat{s}'_k{}^{[i]}$. A signal subtractor component of 430 the i-th stage 400 subtracts $\hat{r}'_k{}^{[i]}$ from $r_k^{[i-1]}$ to yield a modified received signal $r_k^{[i]}$, which is fed to the next stage (not shown in FIG. 5).

The search performed by the i-th MLD stage 400 can be re-localized based on the probability information generated by the decoder 160, improving receiver performance. Particularly, modem bit probability information produced by the decoder 160 can be used to revise the demodulation performed by the i-th MLD stage 400. In one embodiment, the constellation $Q'^{[i]}$ of centroid-based values input to the i-th MLD stage 400 is not modified based on the probability information generated by the decoder 160. Only the metric employed by the MLD component 410 of the i-th stage 400 is modified based on the modem bit probability information. In one embodiment, the MLD component 410 implements the metric given by equation (2) and the metric is modified as given by equation (12) based on the centroid-based probability information calculated by the constellation processing module 140. In another embodiment, the centroid-based values included in the constellation $Q'^{[i]}$ are re-calculated by the constellation processing module 140 based on the modem bit probability information generated by the decoder 160, e.g. as given by equation (8), but the original metric employed by the MLD component 410 remains unmodified. In yet another embodiment, the centroid-based values included in the constellation $Q'^{[i]}$ are re-calculated and the metric employed by the MLD component 410 is modified based on the modem bit probability information. Thus, the i-th non-final MLD stage 400 of the SLI demodulator 150 can re-localize the search for the final symbol decision based on newly determined centroid-based values, the new probability information for the centroid-based values, or both.

The multi-stage SLI demodulator 150 may have an MSA structure. MSA involves sifting through a large set of candidates in multiple stages, where each stage rejects some candidates, until a single candidate remains after the final stage. In a multi-stream scenario such as MIMO or multi-code transmission, MSA increases the number of streams processed jointly in consecutive stages. That is, in the first stage, each stream may be processed individually by a single detector, pairs of streams may be processed together by a JD in the second stage, and so on. Doing so keeps complexity from exploding, while mimicking the behavior of a true JD over all streams, which is MLD in this scenario. SLI can be added to MSA so that JD is combined for a number of MIMO streams, and interference suppression for the remaining streams. The suppression is achieved by a pre-filter that models sources of interference as colored noise. Also, the metric is modified to incorporate a noise covariance matrix.

Figure 6:
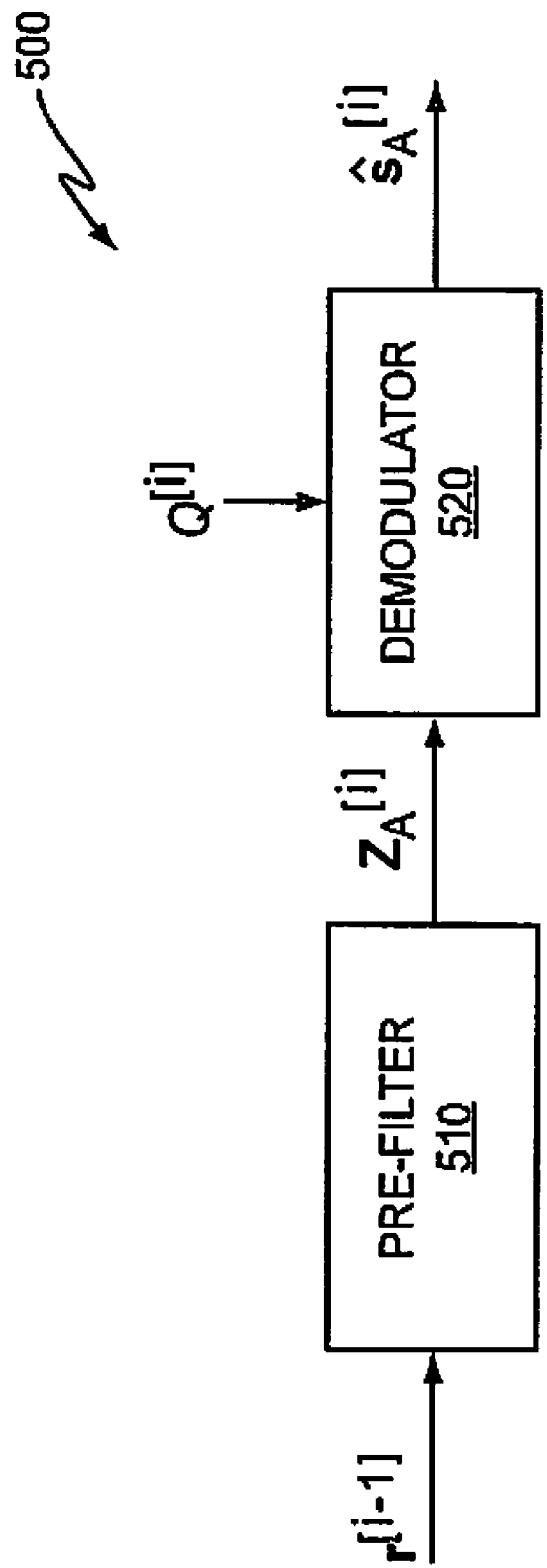
FIG. 6 illustrates a block diagram of an embodiment of an i-th non-final MSA stage of an SLI demodulator.

FIG. 6 illustrates an embodiment of an i-th non-final MSA stage 500 of the SLI demodulator shown 150. The i-th MSA stage 500 performs whitening by demodulating the signals included in set A (denoted as signal $s_A$) while suppressing the remainder of the signals included in set B (denoted as signal $s_B$). The i-th MSA stage 500 includes a pre-filter 510 and a JD 520. The pre-filter 510 filters the signal vector $r^{[i-1]}$ output by the immediately preceding MSA stage (not shown in FIG. 6) to suppress signal set B. The pre-filter output $N_A \times 1$ is a vector denoted by $z_A^{[i]}$. The JD 520 uses centroid-based constellation $Q^{[i]}$ provided by the constellation processing module 140 to perform demodulation and interference suppression on the pre-filter output instead of using the true constellation Q, and the search is over $(q^{[i]})^{N_A}$ candidates $\hat{s}_A^{[i]}$.

In more detail, the JD 520 operates over $N_A$ signals in A to produce $\hat{s}_A^{[i]}$. The metric $m(\hat{s}_A)$ employed by the JD 520 is given by:

$$m(\hat{s}_A) = -2Re\{\hat{s}_A z_A\} + \hat{s}_A^H H_A^H R_u^{-1} H_A \hat{s}_A \quad (15)$$

The metric $m(\hat{s}_A)$ is suited for the i-th non-final MSA stage 500, in that $m(\hat{s}_A)$ puts no particular restriction on $\hat{s}_A$. As such, $\hat{s}_A$ can be replaced with $\hat{s}_A^{[i]}$, and $m(\hat{s}_A^{[i]})$ can be computed based on $\hat{s}_A^{[i]}$ as given by equation (15) with this substitution. As a result, the i-th non-final MSA stage 500 produces a localization of signal $s_A$. The use of $Q^{[i]}$ instead of Q causes an intentional residual signal which acts as self-interference. Equation (1) can be expanded to show the residual signal for a two-stage case as follows:

$$r = H_A s_A^{[1]} + H_A s_A^{[2]} + H_B s_B + n = H_A s_A^{[1]} + v \quad (16)$$

The residual signal $H_A s_A^{[2]}$ can be accounted for by modeling it as a second colored noise, with zero mean, and covariance as given by:

$$R_A^{res} = H_A H_A^H E_A^{res} \quad (17)$$

where $E_A^{res}$ is the energy in the residual signal, corresponding to modulation symbol subset $Q^{[2]}$ for the two-stage case. The total covariance then becomes:

$$R_v = R_B + R_A^{res} + R_n \quad (18)$$

The rest of the operations are similar to that of a conventional whitening JD, except that $R_v$ of equation (18) is used as the total impairment covariance.

In general, at any non-final stage 152 of the SLI demodulator 150, the residual interference can be properly accounted for if the demodulator 150 has an MSA structure. The exception is the final stage 154 of the SLI demodulator 150, where there is no residual interference left, and $E_A^{res}$ in equation (18) is zero. Modem bit probability information produced by the decoder 160 is used to revise the demodulation performed by the i-th non-final MSA stage 500.

In one embodiment, the constellation $Q^{[i]}$ of centroid-based values input to the i-th non-final MSA stage 500 is not modified based on the probability information generated by the decoder 160. Only the metric employed by the JD component 520 of the i-th MSA stage 500 is modified based on the modem bit probability information. In one embodiment, the JD component 520 implements the metric given by equation (15) and the metric is modified adding the probability bias term $-2 \ln(p(s'^{[i]}_j))$ in equation (12) to equation (15). In another embodiment, the centroid-based values included in the constellation $Q^{[i]}$ are re-calculated based on the modem bit probability information, e.g. as given by equation (8), but the original metric employed by the JD component 520 remains unmodified. In yet another embodiment, the centroid-based values included in the constellation $Q^{[i]}$ are re-calculated and the metric employed by the JD component 520 is modified based on the modem bit probability information generated by the decoder 160. Thus, the i-th non-final MSA stage 500 of the SLI demodulator 150 can re-localize the search for the final symbol decision based on newly determined centroid-based values, the new probability information for the centroid-based values, or both.

The multi-stage SLI demodulator 150 may also suppress ISI. SLI can be implemented as part of an equalizer for suppressing ISI. MLD becomes MLSE in the different stages 152, 154 of the SLI demodulator 150 when suppressing ISI. The i-th non-final stage 152 of the SLI demodulator 150 employs MLSE to operate on a trellis defined by the channel and the centroid-based alphabet $Q'^{[i]}$. At each step of the trellis, centroid-based values are computed, e.g. according to equation (8). The branch metrics at each step of the trellis are similar to the metric given by equation (2).

Figure 7:
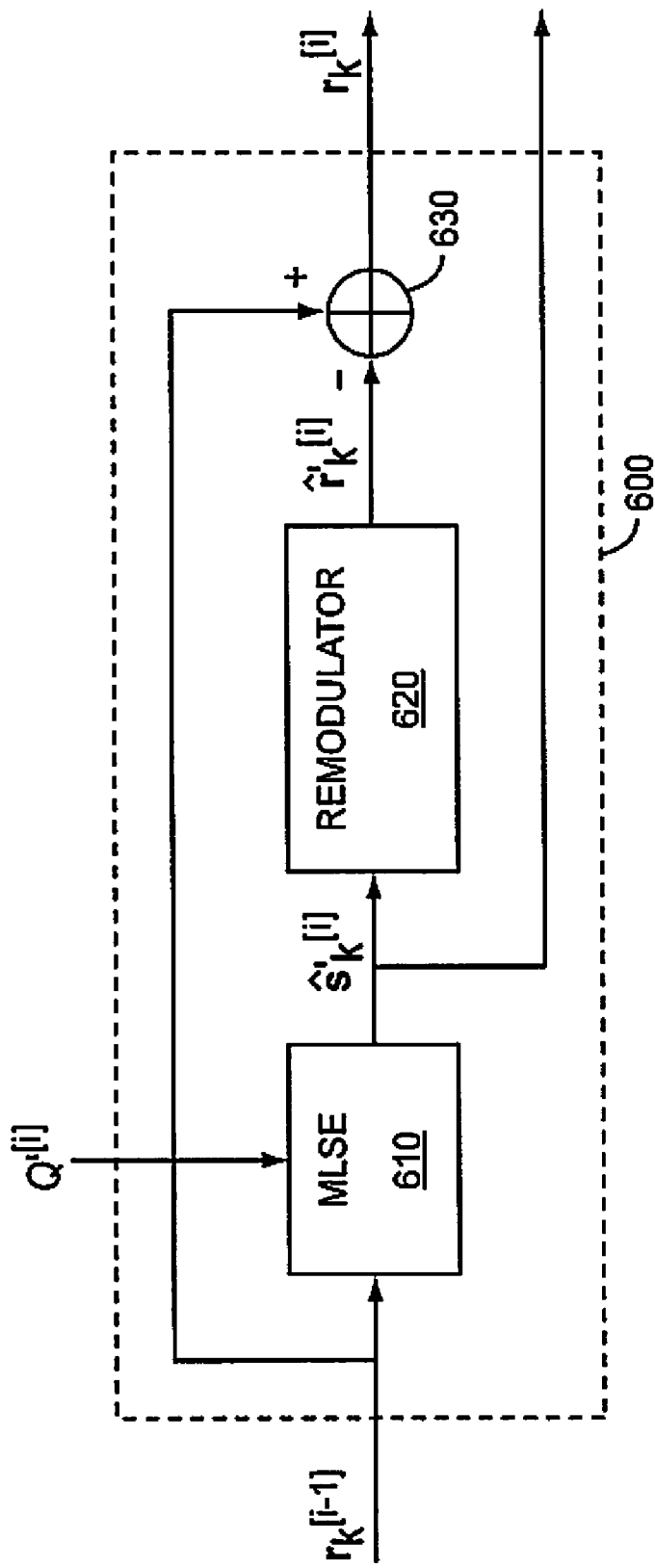
FIG. 7 illustrates a block diagram of an embodiment of an i-th non-final MLSE stage of an SLI demodulator.

FIG. 7 illustrates an embodiment of an i-th non-final MLSE stage 600 of the SLI demodulator 150 which operates as equalizer by suppressing ISI. In one embodiment, the i-th non-final stage includes an MLSE component 610 which operates over a constellation $Q'^{[i]}$ to suppress ISI. Let $q'^{[i]}$ denote the size of $Q'^{[i]}$. The ISI trellis maintained by the MLSE component 610 derives from $Q'^{[i]}$. Particularly, the ISI trellis has $$(q'^{[i]})^M$$

states, and $$(q'^{[i]})^{M+1}$$

branches per stage. Each state has fan-in and fan-out size $q'^{[i]}$. The input to the i-th MLSE stage 600 is the modified received signal $r_k^{[i-1]}$ produced by the immediately preceding stage (not shown in FIG. 7). The constellation $Q'^{[i]}$ input to the i-th MLSE stage 600 includes a set of centroid-based values determined as previously described herein. The MLSE component 610 performs branch metric calculations to produce symbols $\hat{s}'_k^{[i]}$ based on $Q'^{[i]}$ and $r^{[i-1]}$.

In more detail, the branch metric of a branch (j',j) at step k in the MLSE trellis can be expressed as given by:

$$e_k(j',j) = |r_k - H_M \hat{s}_{k-M} + \ldots + H_0 \hat{s}_k|^2 \quad (19)$$

Without much loss of generality, the trellis is assumed to start at time 0 in state 0. The state metric computation proceeds forward from there. At time k, the state, or cumulative, metric $E_k(j)$ of state j is given in terms of the state metrics at time k−1, and the branch metrics at time k is given by:

$$E_k(j) = \min_{j' \in I(j)} (E_{k-1}(j') + e_k(j', j)) \quad (20)$$

In addition, the state in I(j) that achieves the minimum is referred to as the predecessor of state j, and denoted $\pi_{k-1}(j)$. Also, the oldest symbol $\hat{s}_{k-M}$ in the corresponding M-tuple $(\hat{s}_{k-M}, \ldots, \hat{s}_{k-1})$ is the tentative symbol decision looking back from state j at time k. It is possible to trace back a sequence over the different states to time 0, by following the chain $\pi_{k-1}(j), \pi_{k-2}(\pi_{k-1}(j))$, etc. The corresponding symbols $\hat{s}_{k-M}$, $\hat{s}_{k-M-1}$, etc, are the tentative decisions of MLSE looking back from state j at time k. In general, looking back from different states at time k, the decisions tend to agree more the older the symbols. That is, the longer the delay for a decision, the better. Typically, there is a chosen delay D, and the final decision about symbol $s_{k-M-D}$ is made by tracing back from the state $(\hat{s}_{k-M+1} \ldots \hat{s}_k)$ with the smallest state metric. A re-modulator component 620 of the i-th MLSE stage 600 generates a re-modulated signal given by:

$$\hat{r}_k'^{[i]} = H_M \hat{s}_{k-M}'^{[i]} + \ldots + H_0 \hat{s}_k'^{[i]} \quad (21)$$

A signal subtractor component 630 of the i-th MLSE stage 600 subtracts $\hat{r}_k'^{[i]}$ from $r_k^{[i-1]}$ to yield a modified received signal $r_k^{[i]}$, which is provided to the next equalization stage (not shown in FIG. 7).

In one embodiment, the constellation $Q'^{[i]}$ of centroid-based values input to the MLSE component 610 of i-th non-final stage 600 is not modified based on the probability information generated by the decoder 160. Only the metric employed by the MLSE component 610 is modified based on the modem bit probability information. In one embodiment, the MLSE component 610 implements the branch metric represented by equations (19) and (20), and the branch metric is modified by adding the probability bias term $-2 \ln (p(s_l'^{[i]}))$. In another embodiment, the centroid-based values included in the constellation $Q'^{[i]}$ input to the i-th non-final stage 600 are re-calculated based on the modem bit probability information, e.g. as given by equation (8), but the original branch metric used by the MLSE component 610 remains unmodified. In yet another embodiment, the centroid-based values included in the constellation $Q'^{[i]}$ are re-calculated and the branch metric is modified based on the modem bit probability information. Thus, the i-th non-final MLSE stage 600 of the SLI demodulator 150 can re-localize the search for the final symbol decision based on newly determined centroid-based values, the new probability information for the centroid-based values, or both. The various embodiments described herein each provide a mechanism for exploiting feedback from the decoder 160 in a SLI-type structure to boost receiver performance.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of processing a received signal, comprising:
   demodulating the received signal using a multi-stage demodulator, each non-final stage of the multi-stage demodulator localizing a search for a final symbol decision using centroid-based values as constellation points instead of modulation symbols associated with the received signal, a final stage of the multi-stage demodulator determining the final symbol decision using a subset of the modulation symbols as constellation points;
   decoding the final symbol decision by a decoder, including generating probability information related to the modulation symbols;
   revising the final symbol decision based on the probability information related to the modulation symbols;
   re-calculating the centroid-based values based on the probability information related to the modulation symbols; and
   re-localizing the search for the final symbol decision by each non-final stage of the multi-stage demodulator based on the re-calculated centroid-based values.

2. The method of claim 1, comprising:
   grouping the modulation symbols into a plurality of subsets, adjacent ones of the subsets having one or more common modulation symbols so that at least two adjacent subsets overlap;
   determining a centroid-based value for each subset of the modulation symbols for use in localizing the search for the final symbol decision;
   calculating a new centroid-based value for each subset of the modulation symbols based on the probability information generated by the decoder for each modulation symbol included in the corresponding subset of the modulation symbols; and
   re-localizing the search for the final symbol decision based on the new centroid-based values.

3. The method of claim 2, comprising calculating the new centroid-based value for each subset of the modulation symbols based on probability information generated by the decoder for a plurality of modem bits associated with each modulation symbol included in the corresponding subset of the modulation symbols.

4. A method of processing a received signal, comprising:
   demodulating the received signal using a multi-stage demodulator, each non-final stage of the multi-stage demodulator localizing a search for a final symbol decision using centroid-based values as constellation points instead of modulation symbols associated with the received signal, a final stage of the multi-stage demodulator determining the final symbol decision using a subset of the modulation symbols as constellation points;
   decoding the final symbol decision by a decoder, including generating probability information related to the modulation symbols;
   revising the final symbol decision based on the probability information related to the modulation symbols;
   determining new probability information for the centroid-based values based on the probability information related to the modulation symbols; and
   re-localizing the search for the final symbol decision by each non-final stage of the multi-stage demodulator based on the new probability information for the centroid-based values.

5. The method of claim 4, comprising weighting branch metrics calculated by the multi-stage demodulator based on the new probability information for the centroid-based values.

6. The method of claim 5, comprising:
   grouping the modulation symbols into a plurality of subsets, adjacent ones of the subsets having one or more common modulation symbols so that at least two adjacent subsets overlap;
   determining a centroid-based value for each subset of the modulation symbols for use in localizing the search for the final symbol decision;
   calculating a probability of each centroid-based value based on probability information generated by the decoder for a plurality of modem bits associated with each modulation symbol included in the corresponding subset of the modulation symbols;
   generating a composite probability for all of the centroid-based values based on the product of the probabilities of the centroid-based values; and
   weighting the branch metrics based on the composite probability.

7. A method of processing a received signal, comprising:
   demodulating the received signal using a multi-stage demodulator, each non-final stage of the multi-stage demodulator localizing a search for a final symbol decision using centroid-based values as constellation points instead of modulation symbols associated with the received signal, a final stage of the multi-stage demodulator determining the final symbol decision using a subset of the modulation symbols as constellation points;

decoding the final symbol decision by a decoder, including generating probability information related to the modulation symbols;

revising the final symbol decision based on the probability information related to the modulation symbols;

determining new probability information for the centroid-based values based on the probability information related to the modulation symbols;

re-calculating the centroid-based values based on the probability information related to the modulation symbols; and re-localizing the search for the final symbol decision by each non-final stage of the multi-stage demodulator based on the new probability information for the centroid-based values and the re-calculated centroid-based values.

8. The method of claim 7, comprising weighting branch metrics calculated by the multi-stage demodulator based on the new probability information for the centroid-based values and the re-calculated centroid-based values.

9. A method of processing a received signal, comprising:
demodulating the received signal using a multi-stage demodulator, each non-final stage of the multi-stage demodulator localizing a search for a final symbol decision using centroid-based values as constellation points instead of modulation symbols associated with the received signal, a final stage of the multi-stage demodulator determining the final symbol decision using a subset of the modulation symbols as constellation points;

decoding the final symbol decision by a decoder, including generating probability information related to the modulation symbols; and revising the final symbol decision based on the probability information related to the modulation symbols, wherein the received signal is transmitted using a multi-antenna and/or multi-code transmission scheme, the multi-stage demodulator comprises a multi-stage joint demodulator, each non-final stage of the multi-stage joint demodulator suppresses residual interference which arises from using the centroid-based values as constellation points for demodulating the received signal, a final stage of the multi-stage joint demodulator determines the final symbol decision using a subset of the modulation symbols as constellation points, and each non-final stage of the multi-stage joint demodulator re-localizes the search for the final symbol decision based on the probability information related to the modulation symbols.

10. A method of processing a received signal, comprising:
demodulating the received signal using a multi-stage demodulator, each non-final stage of the multi-stage demodulator localizing a search for a final symbol decision using centroid-based values as constellation points instead of modulation symbols associated with the received signal, a final stage of the multi-stage demodulator determining the final symbol decision using a subset of the modulation symbols as constellation points;

decoding the final symbol decision by a decoder, including generating probability information related to the modulation symbols; and revising the final symbol decision based on the probability information related to the modulation symbols, wherein each non-final stage of the multi-stage demodulator comprises a maximum likelihood detector that re-localizes the search for the final symbol decision based on the probability information related to the modulation symbols.

11. A receiver, comprising:
a multi-stage demodulator having one or more non-final stages operable to localize a search for a final symbol decision of a received signal using centroid-based values as constellation points instead of modulation symbols associated with the received signal, and a final stage operable to determine the final symbol decision using a subset of the modulation symbols as constellation points;

a decoder operable to decode the final symbol decision, including generating probability information related to the modulation symbols, wherein the multi-stage demodulator is further operable to revise the final symbol decision based on the probability information related to the modulation symbols; and a constellation processing module operable to re-calculate the centroid-based values based on the probability information related to the modulation symbols, and wherein each non-final stage of the multi-stage demodulator is operable to re-localize the search for the final symbol decision based on the re-calculated centroid-based values.

12. The receiver of claim 11, wherein the constellation processing module is operable to group the modulation symbols into a plurality of subsets, adjacent ones of the subsets having one or more common modulation symbols so that at least two adjacent subsets overlap, determine a centroid-based value for each subset of modulation symbols, and calculate a new centroid-based value for each subset of modulation symbols based on the probability information for each modulation symbol included in the corresponding subset of modulation symbols, and wherein each non-final stage of the multi-stage demodulator is operable to re-localize the search for the final symbol decision based on the new centroid-based values.

13. The receiver of claim 12, wherein the decoder is operable to generate probability information for a plurality of modem bits associated with each modulation symbol included in the respective subsets of the modulation symbols, and the constellation processing module is operable to calculate the new centroid-based value for each subset of the modulation symbols based on the probability information for the plurality of modem bits associated with each modulation symbol included in the corresponding subset of the modulation symbols.

14. A receiver, comprising:
a multi-stage demodulator having one or more non-final stages operable to localize a search for a final symbol decision of a received signal using centroid-based values as constellation points instead of modulation symbols associated with the received signal, and a final stage operable to determine the final symbol decision using a subset of the modulation symbols as constellation points;

a decoder operable to decode the final symbol decision, including generating probability information related to the modulation symbols, wherein the multi-stage demodulator is further operable to revise the final symbol decision based on the probability information related to the modulation symbols; and a constellation processing module operable to determine new probability information for the centroid-based values based on the probability information related to the modulation symbols, and wherein each non-final stage of the multi-stage demodulator is operable to re-localize the search for the final symbol decision based on the new probability information for the centroid-based values.

15. The receiver of claim 14, wherein each non-final stage of the multi-stage demodulator comprises an equalizer operable to suppress intersymbol interference and weight branch metrics used for localizing the search for the final symbol decision based on the new probability information for the centroid-based values.

16. The receiver of claim 15, comprising a constellation processing module operable to group the modulation symbols into a plurality of subsets, adjacent ones of the subsets having one or more common modulation symbols so that at least two adjacent subsets overlap, determine a centroid-based value for each subset of the modulation symbols, calculate a probability of each centroid-based value based on probability information generated by the decoder for a plurality of modem bits associated with each modulation symbol included in the corresponding subset of the modulation symbols, and generate a composite probability for all of the centroid-based values based on the product of the probabilities of the centroid-based values, and wherein each equalizer is operable to weight the branch metrics based on the composite probability.

17. A receiver, comprising:
a multi-stage demodulator having one or more non-final stages operable to localize a search for a final symbol decision of a received signal using centroid-based values as constellation points instead of modulation symbols associated with the received signal, and a final stage operable to determine the final symbol decision using a subset of the modulation symbols as constellation points;
a decoder operable to decode the final symbol decision, including generating probability information related to the modulation symbols, wherein the multi-stage demodulator is further operable to revise the final symbol decision based on the probability information related to the modulation symbols; and
a constellation processing module operable to determine new probability information for the centroid-based values based on the probability information related to the modulation symbols, and re-calculate the centroid-based values based on the probability information related to the modulation symbols, and wherein each non-final stage of the multi-stage demodulator is operable to re-localize the search for the final symbol decision based on the new probability information for the centroid-based values and the re-calculated centroid-based values.

18. The receiver of claim 17, wherein each non-final stage of the multi-stage demodulator comprises an equalizer operable to suppress intersymbol interference and weight branch metrics used for localizing the search for the final symbol decision based on the new probability information for the centroid-based values and the re-calculated centroid-based values.

19. A receiver, comprising:
a multi-stage demodulator having one or more non-final stages operable to localize a search for a final symbol decision of a received signal using centroid-based values as constellation points instead of modulation symbols associated with the received signal, and a final stage operable to determine the final symbol decision using a subset of the modulation symbols as constellation points; and
a decoder operable to decode the final symbol decision, including generating probability information related to the modulation symbols, wherein the multi-stage demodulator is further operable to revise the final symbol decision based on the probability information related to the modulation symbols;
wherein the received signal is transmitted using a multi-antenna and/or multi-code transmission scheme, the multi-stage demodulator comprises a multi-stage joint demodulator, each non-final stage of the multi-stage joint demodulator is operable to localize the search for the final symbol decision using the centroid-based values as constellation points and suppress residual interference which arises from using the centroid-based values as constellation points, a final stage of the multi-stage joint demodulator is operable to determine the final symbol decision using a subset of the modulation symbols as constellation points, and each non-final stage of the multi-stage joint demodulator is further operable to re-localize the search for the final symbol decision based on the probability information related to the modulation symbols.

20. A receiver, comprising:
a multi-stage demodulator having one or more non-final stages operable to localize a search for a final symbol decision of a received signal using centroid-based values as constellation points instead of modulation symbols associated with the received signal, and a final stage operable to determine the final symbol decision using a subset of the modulation symbols as constellation points; and
a decoder operable to decode the final symbol decision, including generating probability information related to the modulation symbols, wherein the multi-stage demodulator is further operable to revise the final symbol decision based on the probability information related to the modulation symbols;
wherein each non-final stage of the multi-stage demodulator comprises a maximum likelihood detector operable to re-localize the search for the final symbol decision based on the probability information related to the modulation symbols.

* * * * *

UNITED STATES PATENT AND TRADEMARK OFFICE
CERTIFICATE OF CORRECTION

PATENT NO. : 8,379,774 B2
APPLICATION NO. : 12/609466
DATED : February 19, 2013
INVENTOR(S) : Khayrallah It is certified that error appears in the above-identified patent and that said Letters Patent is hereby corrected as shown below:

In the Specification:

In Column 3, Line 64, delete "$\tilde{s}_j^t[i]$" and insert -- $\hat{s}_j^t[i]$ --, therefor.

In Column 10, Line 39, delete "$r^{[i-1]}$." and insert -- $r_k^{[i-1]}$ --, therefor.

In Column 10, Line 66, delete "$S_{k-M-D}$" and insert -- $\hat{S}_{k-M-D}$ --, therefor.

Signed and Sealed this
Fourth Day of June, 2013

Teresa Stanek Rea
*Acting Director of the United States Patent and Trademark Office*